United States Patent [19]

Halasa et al.

[11] 3,829,554

[45] Aug. 13, 1974

[54] PURIFICATION OF PHOSPHAZENE MONOMER

[75] Inventors: Adel F. Halasa, Bath; Dennis L. Snyder, Kent, both of Ohio

[73] Assignee: The Firestone Tire & Rubber Company, Akron, Ohio

[22] Filed: Dec. 3, 1971

[21] Appl. No.: 204,707

[52] U.S. Cl. .................................. 423/300, 260/2
[51] Int. Cl. ...................... C01b 21/00, C01b 25/00
[58] Field of Search .................................. 423/300

[56] References Cited
UNITED STATES PATENTS

| | | | |
|---|---|---|---|
| 3,370,020 | 2/1968 | Allcock et al. | 423/300 UX |
| 3,379,510 | 4/1968 | Jaszka | 423/300 |

OTHER PUBLICATIONS

Audrieth et al., "Chemical Reviews," Vol. 32, Pages 111–122, (1943).

*Primary Examiner*—M. Weissman

[57] ABSTRACT

A process for increasing the yield of useful products obtained from polymerization of the distillate from impure commercially available $(NPCl_2)_n$ starting material, to $(NPCl_2)_x$ rubber and derivatives thereof, the process consisting of preheating the impure material prior to distillation thereof. The subscript "$n$" in this specification represents an integer generally 7 or less. The subscript "$x$" in this specification represents an integer up to about 50,000.

2 Claims, No Drawings

PURIFICATION OF PHOSPHAZENE MONOMER

The classical methods for preparing $(NPCl_2)_n$ by reaction of $PCl_5$ with $NH_4Cl$ result in a product which comprises trimer, tetramer and higher oligomers, both cyclic and linear, e.g., as described in U.S. Pat. Nos. 3,462,247 and 3,026,174 and elsewhere in the literature, the composition of the product varying from batch to batch depending on variations in the purity of the starting materials and their relative proportions, variations in the reaction conditions, and other factors not fully known.

As a consequence, when polymerization of the impure product is attempted to form polymers such as those described in U.S. Pat. Nos. 3,370,020 and 3,515,688, the ultimate product possesses properties which are not as predictable as would be desired.

It has now been found that the yield of useful polymer product can be greatly improved by a preliminary heat treatment of the impure material prior to the distillation thereof. The distilled material which has been heat-treated prior to distillation yields a high yield of useful product when polymerized.

Briefly, the present invention resides in the heating of impure $(NPCl_2)_n$ in a vessel adapted to be heated under a suitable atmosphere for a brief interval of time prior to the distillation of impure $(NPCl_2)_n$ and thereafter proceeding with the polymerization procedure as described in U.S. Pat. No. 3,515,688 noted above.

Although the reason for the nature of the changes which are brought about by the preliminary heating are not fully understood, it is found that a more predictable polymerization and a higher yield of soluble linear polymer from the impure starting material results from the heating.

The procedure will be more fully understood from the example which follows which illustrates a preferred practice of the invention.

Impure commercially available $(NPCl_2)_n$ is charged to a distillation apparatus open to the air. The apparatus is evacuated and filled to ambient pressure with $N_2$. The temperature is then raised to approximately 220° C. and held at that temperature 15 to 180 minutes.

The use of a nitrogen atmosphere is presently preferred in order to insure greater uniformity in the products, but air, argon or other noble gases may be used in place of the nitrogen.

Similarly, a temperature in the range of 220° C. to 250° C. is preferred, but temperatures as low as 70° C. to 90° C. could conceivably be used, although the heating time would be extended to an impractical extent.

The preheating is preferably carried out at atmospheric pressure, but lower or higher pressures can be used, depending on the temperature and duration of heating.

After the preheating has been effected, and the impure $(NPCl_2)_n$ has been distilled, polymerization of the distillate is carried out as described in the prior art, e.g., by heating in an inert atmosphere at temperatures between about 220° C. - 320° C., in a polymerization vessel in which the pressure is initially reduced to about $10^{-3}$ mm Hg, whereby a $(NPCl_2)$ rubber is produced which is readily derivatized as described in U.S. Pat. Nos. 3,370,020, 3,515,688 and elsewhere in the prior art.

The invention will become more readily apparent from a comparison of Examples 1 and 2 which follow.

EXAMPLE I

A 12 liter flask fitted with a take-off condenser (heated with a heating tape to prevent solidification of the distillate) and a thermometer to measure liquid temperature was charged with 12 pounds of impure commercially available phosphonitrilic chloride trimer (70 percent trimer, 30 percent tetramer). The flask was heated with a heating mantle and distillation was started when the pot temperature reached 135°-140° C. The distillate temperature was 112°-118° C. at 5 mm. Hg. A fraction was collected which was 80 percent of the impure material charged to the flask. Only 50 percent of the fraction collected gave useful $(NPCl_2)_3$ monomer for polymerization to $(NPCl_2)_n$ rubber.

EXAMPLE II

The procedure of Example I was repeated except the distillation vessel was preheated at 200°-250° C. under a nitrogen atmosphere for 2 hours. After the preheat treatment the distillation vessel temperature was adjusted to 135°-140° C. and the distillation was started. A fraction was collected at 115° C.-122° C. which accounted for 90 percent of the total charge. All of the fraction collected was usable for polymerization to $(NPCl_2)_n$ rubber. The chloride rubber gave useful product when derivatized with fluoroalcohols by means known in the art, e.g., as described in the above noted United States patents.

We claim:

1. A process for increasing the yield of useful polymer products obtained by the thermal polymerization of impure $(NPCl_2)_n$ produced by reaction of $PCl_5$ with $NH_4Cl$ wherein n represents a small integer less than about 7 and which impure $(NPCl_2)_n$ consists principally of $(NPCl_2)_3$ and $(NPCl_2)_4$ which process consists of:
   1. preheating said impure $(NPCl_2)_{17}$ under an inert atmosphere for a brief interval of time insufficient to effect any substantial polymerization of said impure $NPCl_2$, said heating being for between about 15 minutes and about 180 minutes and at a temperature about 220°C;
   2. thereafter distilling the preheated material;
   3. recovering the distillate produced as a result of said distillation; and
   4. then polymerizing said distillate by heating the same in an inert atmosphere at temperatures between about 220°C and 320°C in a polymerization vessel in which the pressure is initially reduced to about $10^{-3}$ mmHg to produce useful products of the general formula $(NPCl_2)_x$ wherein x represents an integer less than about 50,000.

2. The process of claim 1 wherein the preheating is under a nitrogen atmosphere.

* * * * *

PO-1050
(5/69)

UNITED STATES PATENT OFFICE
CERTIFICATE OF CORRECTION

Patent No. 3,829,554     Dated August 13, 1974

Inventor(s) Adel F. Halasa and Dennis L. Snyder

It is certified that error appears in the above-identified patent and that said Letters Patent are hereby corrected as shown below:

In Column 1, Line 48, "220°C." should be --200°C.--.

In Column 2, Line 44, "$(NPCl_2)_{17}$" should be --$(NPCl_2)_n$--.

Signed and sealed this 19th day of November 1974.

(SEAL)
Attest:

McCOY M. GIBSON JR.
Attesting Officer

C. MARSHALL DANN
Commissioner of Patents